Patented Nov. 6, 1945

2,388,306

UNITED STATES PATENT OFFICE 2,388,306

METHOD OF TREATING TUNGSTATE SOLUTIONS

Blair Burwell, Uravan, Colo., assignor to United States Vanadium Corporation, a corporation of Delaware No Drawing. Application January 23, 1943, Serial No. 473,395

5 Claims. (Cl. 23—24)

Tungsten minerals, for instance scheelite, wolframite, hubnerite, and ferberite, often occur in such intimate association with other minerals that complete separation by mechanical methods is impractical. Efficient separation of the tungsten in such instances can be achieved by leaching or digesting finely ground ore, or one or more fractions thereof obtained from mechanical partial separation operations, with an aqueous alkaline agent such as sodium hydroxide or sodium carbonate.

Because of its availability, relatively low price, and amenability to shipment, storage, and use, a preferred alkaline agent is sodium carbonate (soda ash). A hot concentrated solution of sodium carbonate, containing an excess of the sodium carbonate over that required to react with all of the tungsten mineral, and at a temperature above its normal boiling point may be used in the presence of steam under pressure to extract practically all of the tungsten from even a low-grade tungsten ore. The leach liquor may then be decanted or filtered from the insoluble residue.

The resulting leach liquor contains not only tungsten as sodium tungstate but also residual sodium carbonate. To recover the tungsten from solution, it is customary to convert the sodium tungstate to insoluble calcium tungstate. The addition of lime or calcium chloride to the hot leach liquor is an inexpensive means for precipitating the tungsten as calcium tungstate; but the calcium ion will also react with some of the residual sodium carbonate to form a precipitate of calcium carbonate, thereby contaminating the calcium tungstate. Therefore, it is desirable to remove the dissolved carbonate from solution before precipitating the calcium tungstate.

The principal object of this invention is to provide an improved method of treating solutions containing both sodium tungstate and sodium carbonate to remove the carbonate from solution, and a further object is such a method including the step of precipitating from such solution a substantially pure calcium tungstate. Other objects of the invention will be apparent as the following description proceeds.

An inexpensive way to destroy the carbonate in solution is to acidify the solution with sulfuric acid, thereby liberating carbon dioxide, which rapidly leaves the hot solution, and forming sodium sulfate. But the presence of sulfate in the acidified solution presents a new problem in that the addition of lime or calcium chloride to such a solution will precipitate calcium sulfate with the calcium tungstate. Because of the cheapness and availability of sulfuric acid, its use for the purpose of removing the carbonate would be advantageous if the subsequent coprecipitation of calcium sulfate could be avoided. Hence, a further object of this invention is a method wherein removal of carbonate is accomplished with sulfuric acid and substantially pure calcium tungstate is subsequently precipitated from the solution.

According to the present invention, hot aqueous solutions containing sodium tungstate and sodium carbonate are treated with sulfuric acid in a proportion to decompose at least most of the carbonate, the pH of the solution is adjusted by an addition of lime to a value at least 7 and preferably in the neighborhood of 9, the solution is agitated for at least thirty minutes and preferably one to seven hours, and lime is thereafter added portionwise to precipitate calcium tungstate from the hot solution. The precipitation of calcium sulfate from the hot solution is prevented at the low concentration of calcium present during the addition of the first portions of lime. Such first portions of lime react with the sodium tungstate to form calcium tungstate and sodium hydroxide, and the sodium hydroxide prevents the precipitation of calcium sulfate at higher concentrations of calcium. Thus, throughout the precipitation step, substantially pure calcium tungstate is precipitated.

The solution is preferably kept hot during the entire operation just described, temperatures of 100° to 212° F. being suitable and about 150° to 200° F. being preferred.

The lime (calcium hydroxide) is preferably added as milk of lime, but it may be added as either unslaked lime (calcium oxide) or as solid or semisolid slaked lime.

If the solution contains so little sodium tungstate that upon adding the lime the concentration of sodium hydroxide will be less than ten grams of NaOH per liter, it will be advisable to add enough sodium hydroxide, before or during the addition of lime, to yield a concentration after the lime addition at least ten grams of NaOH per liter.

The precipitated calcium tungstate may be recovered in substantially pure form by decantation or filtration, and by washing with water.

In addition to the advantages pointed out herein, the method of the invention has the further advantage of permitting the maintenance of hot solutions throughout the operation. It is not necessary to chill the effluent of the ore digester and to reheat it for the calcium tungstate precipitation step; although if desired such cooling and reheating may of course be done.

The following detailed examples illustrate typical procedures used in carrying out the process of the invention.

Example 1

To a batch of sodium tungstate solution amounting to 112,699 pounds, containing 3625.8 pounds of $WO_3$ as sodium tungstate, and 5,335 pounds of $SO_3$, and having a pH of 3.3 and an initial temperature 160° F., was added 780 pounds of calcium oxide. The mixture was agitated for five hours, during which time the pH rose to 7 and the temperature rose to 192° F., a temperature which was maintained constant throughout the rest of the treatment. At the end of the five hours, 120 pounds of calcium oxide was added, and at hourly intervals thereafter four more 120 pound additions of calcium oxide were made.

After a three hour interval, 60 pounds of calcium oxide was added, and thereafter at hourly intervals four more 60 pound additions of calcium oxide were made. Two hours after the last lime addition the precipitation was complete, and the precipitate was then separated from the solution by filtration, washed, and roasted. The washed precipitate weighed 5471.8 pounds and analyzed 65.79% $WO_3$ with a sulfur content of 0.19%. The filtrate analyzed 0.231 gram $WO_3$ per liter and 56.52 grams $SO_4$ per liter. The recovery of $WO_3$ was 99.3% and the contamination with calcium sulfate was insignificant.

Example 2

To a batch of hot sodium tungstate solution amounting to 111,238 pounds, containing 3477.2 pounds of $WO_3$ as sodium tungstate, and 6460 pounds of $SO_3$, and having a pH of 3.1, was added 250 pounds of sodium hydroxide whereby the pH was raised to 5.3. To this solution there was added 780 pounds of calcium hydroxide, and the mixture was heated and agitated for five hours, during which time the temperature rose to 178° F. and the pH rose to 9.6. After the five hours, 120 pounds of calcium oxide was added, and at one-hour intervals thereafter seven 120 pound additions of calcium oxide were made, while the temperature gradually rose to 192° F. Two hours after the last of the 120 pound additions, sixty pounds of calcium oxide were added and an hour later another sixty pounds of calcium oxide were added. Three and one-half hours after the last lime addition, the precipitate was separated from the solution by filtration, washed, and roasted. The precipitate weighed 5636.4 pounds and contained 3442.7 pounds of $WO_3$, representing a recovery of 99%. The washed precipitate analyzed 61.08% $WO_3$ and 0.18% sulfur. The filtrate analyzed 0.305 grams per liter of $WO_3$, 69.39 grams per liter of $SO_4$, and 5.6 grams per liter of NaOH.

I claim:

1. Method of precipitating substantially pure calcium tungstate from a hot aqueous solution containing sodium tungstate and a substantial proportion of sodium sulfate, which comprises adjusting the pH of said solution to a value of at least 7, and adding lime portionwise thereto while maintaining in said solution a concentration of at least 10 grams per liter of sodium hydroxide.

2. Method as claimed in claim 1 wherein the pH of the solution is maintained at approximately 9, and lime is added portionwise thereto while the solution is agitated and maintained at a temperature between 100° and 212° F.

3. The process which comprises adding, to an aqueous solution containing sodium tungstate and sodium carbonate, sulfuric acid to destroy at least most of the carbonate, adjusting the pH of the solution to a value above 7, and adding thereto successive portions of lime to precipitate substantially pure calcium tungstate without precipitating any substantial amount of calcium sulfate.

4. The process which comprises adding, to a hot aqueous solution of sodium tungstate and sodium carbonate, sulfuric acid in an amount substantially that required to destroy all of the carbonate, adding enough sodium hydroxide and lime to adjust the pH of the solution to a value in the neighborhood of 9, and precipitating substantially pure calcium tungstate without precipitating any substantial amount of calcium sulfate by adding lime portionwise.

5. The process claimed in claim 4, wherein the hot solution is maintained at a temperature between 100° and 212° F. throughout said process.

BLAIR BURWELL.